(12) United States Patent
Varkey (10) Patent No.: US 8,000,572 B2
(45) Date of Patent: Aug. 16, 2011

(54) METHODS OF MANUFACTURING COMPOSITE SLICKLINE CABLES

(75) Inventor: Joseph Varkey, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 165 days.

(21) Appl. No.: 11/384,884

(22) Filed: Mar. 20, 2006

(65) Prior Publication Data

US 2006/0260739 A1   Nov. 23, 2006

(51) Int. Cl.
*G02B 6/44* (2006.01)

(52) U.S. Cl. .......................................... 385/100

(58) Field of Classification Search ................ None
See application file for complete search history.

(56) References Cited

U.S. PATENT DOCUMENTS

| | | | |
|---|---|---|---|
| 4,259,382 A | 3/1981 | Schwan | |
| 4,381,141 A | 4/1983 | Sakuragi et al. | |
| 4,687,293 A | 8/1987 | Randazzo | |
| 4,703,134 A * | 10/1987 | Uematsu | 174/106 SC |
| 4,805,981 A | 2/1989 | Gould | |
| 5,892,873 A | 4/1999 | Tatat | |
| 5,894,104 A * | 4/1999 | Hedberg | 174/36 |
| 6,493,914 B2 | 12/2002 | Kaiser et al. | |
| 6,568,072 B2 | 5/2003 | Wilemon et al. | |
| 6,734,805 B2 * | 5/2004 | Johnson | 340/854.4 |
| 6,857,452 B2 | 2/2005 | Quigley et al. | |
| 6,960,724 B2 * | 11/2005 | Orlet et al. | 174/102 R |
| 2003/0169179 A1 | 9/2003 | James, II | |
| 2004/0213529 A1 | 10/2004 | Dowd et al. | |
| 2005/0236730 A1 | 10/2005 | Joshi et al. | |
| 2006/0260739 A1 * | 11/2006 | Varkey | 156/244.12 |

FOREIGN PATENT DOCUMENTS

| | | |
|---|---|---|
| EP | 1491929 | 12/2004 |
| WO | WO99/30191 | 6/1999 |

* cited by examiner

*Primary Examiner* — Uyen-Chau N Le
*Assistant Examiner* — Hoang Tran
(74) *Attorney, Agent, or Firm* — Michael L. Flynn; David R. Hofman; Jody DeStefanis (57) ABSTRACT

Disclosed are wellbore electric cables, and methods of manufacturing such cables, and in one aspect, methods of manufacturing wireline composite slickline cables. Some embodiments are methods which include preparing a slickline cable by providing an inner metallic tube containing at least one conductor (such as an optical fiber), disposing an epoxy/fiber composite strength layer substantially upon the outer periphery of the inner metallic tube, and exposing the combination of the inner metallic tube and composite strength layer to at least one technique for minimizing the variation in diameter and providing a substantially uniform circular cross-sectional shape of the combination. Further, an outer metallic tube is draw around the combination of the composite strength member and the inner metallic tube, to form a wellbore slickline. Cables prepared using such methods are also disclosed.

17 Claims, 8 Drawing Sheets

METHODS OF MANUFACTURING COMPOSITE SLICKLINE CABLES

This non-provisional patent application claims priority to provisional application Ser. No. 60/681,421 filed May 16, 2005.

BACKGROUND OF THE INVENTION

This invention relates to wellbore slickline electric cables, and methods of manufacturing and using such cables. In one aspect, the invention relates to a method of manufacturing wireline composite slickline cables.

Generally, geologic formations within the earth that contain oil and/or petroleum gas have properties that may be linked with the ability of the formations to contain such products. For example, formations that contain oil or petroleum gas have higher electrical resistivity than those that contain water. Formations generally comprising sandstone or limestone may contain oil or petroleum gas. Formations generally comprising shale, which may also encapsulate oil-bearing formations, may have porosities much greater than that of sandstone or limestone, but, because the grain size of shale is very small, it may be very difficult to remove the oil or gas trapped therein. Accordingly, it may be desirable to measure various characteristics of the geologic formations adjacent to a well before completion to help in determining the location of an oil- and/or petroleum gas-bearing formation as well as the amount of oil and/or petroleum gas trapped within the formation.

Logging tools, which are generally long, pipe-shaped devices, may be lowered into the well to measure such characteristics at different depths along the well. These logging tools may include gamma-ray emitters/receivers, caliper devices, resistivity-measuring devices, neutron emitters/receivers, and the like, which are used to sense characteristics of the formations adjacent the well. A wireline cable, such as a slickline cable, connects the logging tool with one or more electrical power sources and data analysis equipment at the earth's surface, as well as providing structural support to the logging tools as they are lowered and raised through the well. Generally, the wireline slickline cable is spooled out of a drum unit from a truck or an offshore set up, over pulleys, and down into the well.

Slickline cables used in the oilfield industry typically consist of metallic tubes containing optical fibers or insulated copper conductors. The tubes are typically made of Iconel® which is non-corrosive, but is inherently low in strength. This lack of strength prevents these slickline cables from being used with much pull force. Because slickline cables have metallic tubes and are used with relatively small sheaves (16 to 20 in. in diameter) they are also prone to yielding and failure as they pass over sheaves.

Figures 1A, 1B, 2:
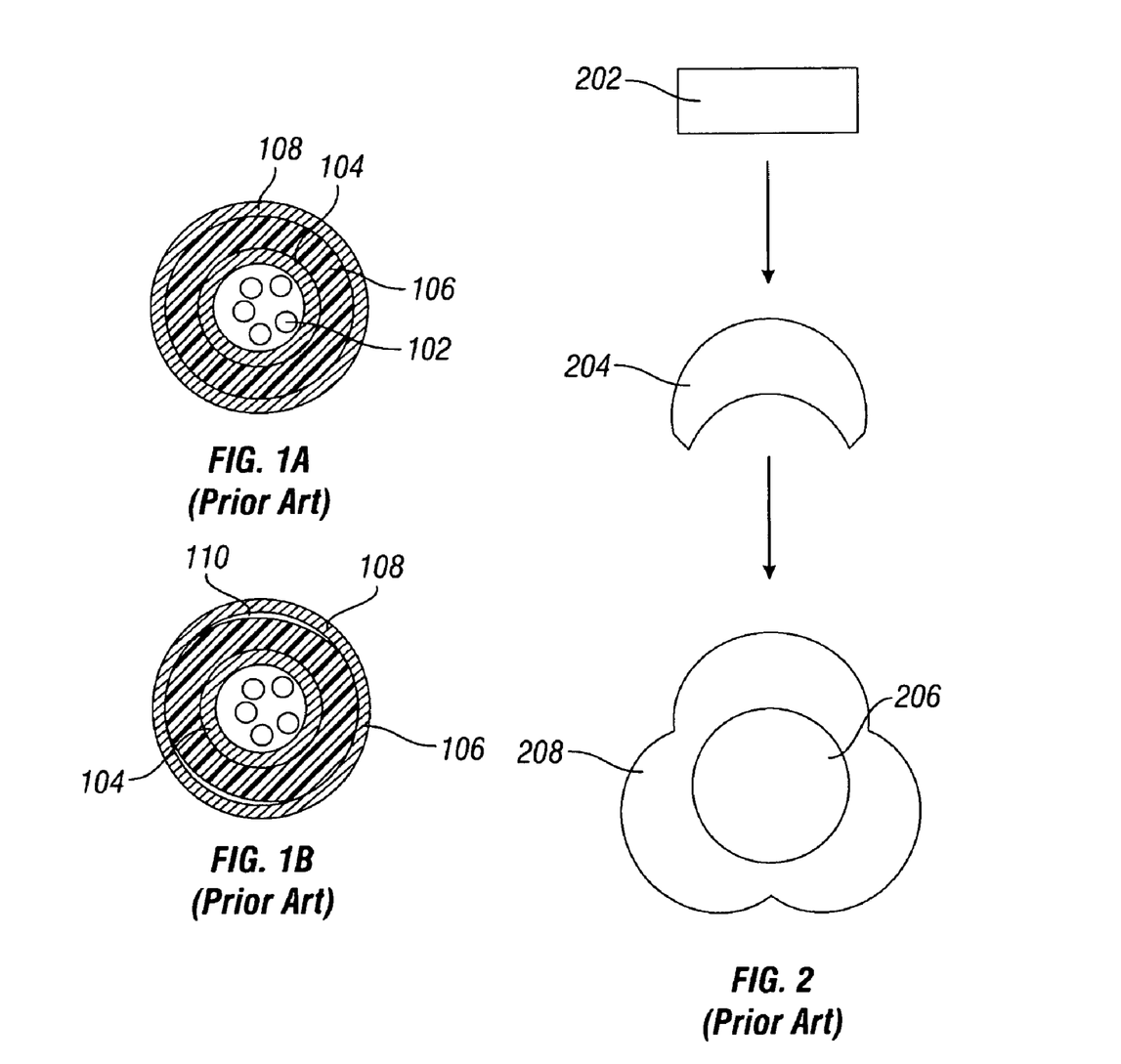
FIGS. 1A and 1B graphically show by cross-sectional representation, common slickline cable designs 1A and some problems encountered with slickline cables manufactured according to prior art methods 1B.
FIG. 2 illustrates by cross-sectional representation, the problems presented as slickline cables are prepared according to prior art methods.

Commonly, slickline cable designs use an epoxy/fiber composite sandwiched between two steel tubes with optical fibers contained in the inside tube. As shown in FIG. 1A, in some designs, optical fibers 102 (only one indicated) are placed in a central stainless steel tube 104. Epoxy/long fiber composite 106 is then pultruded over the tube 104, and an outer tube 108 is generally placed over the composite 106. The composite 106 provides a lightweight strength member as well as a hydrogen-resistant barrier for small, stand alone optical fiber conductors. But, as the long fibers in the epoxy/long fiber composite 106 and the metal forming the tubes 104 have significantly different thermal coefficients, the epoxy/long fiber composite 106 tends to deform during heat curing (at 400° to 500° F.) into a slightly irregular oval shape, as indicated by the gaps 110 (only one indicated) as shown in FIG. 1B. An outer stainless steel tube 108 is then drawn over the outside of the epoxy/long fiber composite 106. When the epoxy/long fiber composite 106 irregular profile resulting in gaps 110 is left uncorrected before applying the outer stainless steel tube 108, that tube 108 becomes especially vulnerable to failure during handling (for example at crossover points on drums, or when going over sheaves) and during operations in the field. Also, in some instances, loose fibers on the surface of the epoxy/fiber composite material 106 can build up at the entrances to extrusion tip and lead to jamming/interruption of the manufacturing process line.

One method of correcting the composite layer's 106 profile is to compression extrude a polymer layer over the composite layer before applying the outer steel jacket. This causes several problems. First, because the profile can be as much as 7 to 15 mil out of round, an equivalent amount of coating would be required, thereby increasing the line's diameter, and most often, there is no space available in slickline cables to allow for coatings of that thickness. Second, applying compression-extruded polymer over the epoxy/long fiber composite reheats the epoxy. This reheating releases moisture and other volatile residues causing blistering of the extruded polymer. Third, loose fibers or fuzz from the epoxy/fiber composite collect at the back of the tip of the extruder head due to fuzz build-up from the cured pultruded core. This leads to jamming at the tip of the extruder and cable breaks, which prevents long-length extrusions.

Also, in the manufacturing process, as illustrated in FIG. 2, three uncured rectangular "tows" 202 of epoxy/fiber composite are brought together over the inside steel tube 104 of FIG. 1, as tube 104 enters a pultrusion die. As each of the tows 202 is bent around the center metallic tube, the greatest tension occurs at the edges of the bent tow profile 204, causing the fibers to move toward the middle, to an area of lower tension. This causes each of the tows to distort as shown in 204. As a result, after exiting the pultrusion die over the inside steel tube 206 and contents thereof, the completed profile 208 of the epoxy/composite layer assumes a "cloverleaf" shape. Such a cloverleaf shade not only has significant variation in diameter about the periphery, but also varied domains of relative fiber/epoxy concentrations which may result in further weakening and making the cable less durable.

Thus, the need exists for reliable and efficient methods for manufacturing slickline cables consisting of an epoxy/fiber composite with improved circular profile consistency and distribution of fibers in the composite, and where the cable remains substantially round in cross-sectional shape while the cable is in use. Such a need is met at least in part by the following invention.

SUMMARY OF THE INVENTION

This invention relates to wellbore slickline electric cables, and methods of manufacturing and using such cables, and in one aspect, methods of manufacturing wireline composite slickline cables. In some embodiments, the methods of the invention include preparing a slickline cable by providing an inner metallic tube containing at least one conductor (such as an optical fiber), disposing an epoxy/fiber composite strength layer substantially upon the outer periphery of the inner metallic tube, and exposing the combination of the inner metallic tube and composite strength layer to at least one technique for minimizing the variation in diameter and providing a substantially uniform circular cross-sectional shape of the combination. Further, an outer metallic tube is draw around the combination of the composite strength member and the inner metallic tube, to form a wellbore slickline.

Any suitable technique for minimizing the variation in diameter and providing a substantially uniform circular cross-sectional shape of the combination of the composite strength member and the inner metallic tube may be employed. In one embodiment, this technique may include passing the combination through three progressively smaller diameter dies and baths of liquid epoxy, then pressure extruding a thin layer of epoxy upon the combination at a viscosity sufficient to maintain the round profile before and during exposure to UV radiation. Another technique includes passing the combination of the tube and composite layer through an infrared heater to remove and volatiles from the epoxy, and then passing the combination through a polymer backflow compression extrusion die. Yet, another technique used for inner tube/composite combination where the composite is applied from the form of a tow, includes passing the combination of the inner metallic tube and composite strength tows (which may be coated with liquid epoxy) through a first cloverleaf shaped die, passing the combination through a second circular shaping die, and then passing the combination through slightly smaller third circular shaping die. Still, another embodiment includes passing the combination of the inner metallic tube and composite strength layer through a first and second split die, where a layer of epoxy is applied over the combination as the combination passes through the first split die. Also, some embodiments may use two or more different techniques in series to help minimize the variation in diameter and provide a substantially uniform circular cross-sectional shape of the combination of the composite strength member and the inner metallic tube.

In embodiments where epoxy/fiber tows are used to form the composite tube, the tows may be applied to an inner metallic tube by passing the tows through channels on a shaping guide and making contact with the metallic tube at the tip of the guide. Some embodiments may also include disposing a glass fiber tape upon the combination of the inner tube and composite layer before passing the combination through an infrared heat source to help maintain the diameter and circular shape.

In addition, the invention also includes slickline cables prepared according to the methods disclosed, as well as methods of using a slickline cable deployed in a wellbore for measuring the properties of subterranean formations.

BRIEF DESCRIPTION OF THE DRAWINGS

The invention may be understood by reference to the following description taken in conjunction with the accompanying drawings, in which.

DETAILED DESCRIPTION

The description and examples are presented solely for the purpose of illustrating the preferred embodiments of the invention and should not be construed as a limitation to the scope and applicability of the invention. While the some embodiments of the invention are described herein as comprising certain materials, it should be understood that the composition could optionally comprise two or more different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context.

The invention relates to wellbore slickline electric cables, and methods of manufacturing and using such cables, and particularly methods of manufacturing composite slickline cables. The methods of the invention provide efficient, reliable methods of manufacturing slickline cables consisting of an epoxy/fiber composite material layer with a consistent circular profile sandwiched between two metallic tubes (inner and outer tube), with optical fibers contained within the inner tube. The epoxy/fiber composite material restricts the yielding of the tube when the cable is pulled over sheaves and also contributes to a higher strength-to-weight ratio for the cable.

The methods of the invention produce durable slickline wellbore cables with minimal variation in diameter and substantially uniform circular cross-sectional shape throughout its length, the cable formed of low-resin-content epoxy/fiber composite disposed between inner and outer metallic tubes, where the inner tube contains at least one conductor, such as an electrical conductor, an optical fiber, or a combination thereof. Variations in the diameter and cross-sectional shape of the combination of the composite and inner tube combination result in a variation on diameter and shape of the completed slickline cable, which may lead to cable strength, durability, and/or deployment issues.

Variations in diameter and cross-sectional shape due to thermal expansion differences between the cable elements may be minimized by such means as flash curing the outer surface of the composite using infrared heating, disposing a tape (such as a glass fiber tape for example) over the composite, using a UV-curable epoxy shell for the composite, or any combination thereof. Variations due to tension differences in the fibers during pultrusion may be minimized by using an array of dies including cloverleaf die followed by circular dies, circular dies arranged in a sequence with varied die diameters (i.e. diameters of the die exit ports), coating the composite surface with polymer back flow, applying thin coating of epoxy after the composite is at least partially cured, or any combination thereof.

Distortions in surface of composite layer due to fibers protruding above the surface of the composite (also termed "fuzz") may also result in variation in diameter and non-circular cross-sectional shape. The fuzz formation may be improved using, for instance, polymer back flow during extrusion, post coating of epoxy after the composite is fully cured and/or semi-cured, back flow of UV curable epoxy, or any feasible combination thereof.

Any of the above described techniques for minimizing variation in diameter and non-circular cross-sectional shape may be used either alone or in any suitable combination.

When an optical fiber or fibers are used, they may be single-mode or multi-mode fibers, or mixtures thereof, with a step index or a graded index fiber type. The fibers are preferably high temperature, multi-mode fibers. Even more preferably, the fibers are size 50/125/400/700 µm fibers manufactured with Si/PFA, such as those materials manufactured by Sumitomo. Such fibers have a strength rating of about 100 kpsi, a high temperature rating, and an attenuation of 1 db/km at 1300 nm, 400 MHz. The fibers may have a protective buffer layer or a hydrogen-scavenging layer, if desired. While the fiber is typically used in well monitoring to transmit data between two devices (from a downhole sensor to an uphole processor), the fiber itself may serve as the sensor. In such a practice, a surface device sends a signal down the fiber even though it is not terminated to a device at the other end. Partially reflected bits of the signal echo back up the line and the same surface device collects this data. Well conditions affect the properties of the fiber, the fiber causes variations in the reflected signal, and these variations can provide valuable information about the well.

The inner metallic tube, which functions at least in part to protect the contents, may have an outer diameter from about 0.03 inches to about 0.4 inches, preferably about 0.05 inches, and be made of any suitable material, including stainless steel, such as a 304SS, 316SS, or an alloy such as INCONEL® A625, A825, or G31, which are high strength austenitic nickel-chromium-iron alloys that have exceptional anti-corrosion and heat-resistance properties. A tube manufactured from any of these materials can withstand pressures in excess of about 15,000 to about 20,000 psi and will have minimum bend radii at least about 8 inches, depending on tube size/dimensions. The tubes may also be strong enough to terminate in electrical applications as if they were regular conductor wire.

The outer metallic tube may be welded around the insulated tube composite assembly. While any suitable tube material may be employed, tubes most commonly used are based upon 316SS or A825, and is preferably about 0.125 inch outer diameter (OD) with, for example but not limited to, about 0.022, 0.028, 0.035, or 0.049 inch wall thickness. Most preferably, the tube is about 0.125 inch OD, about 0.022 inch wall thickness, A825. A825 is preferred because of its strength and resistance to corrosion, even at high temperatures. As is appreciated in the art, most downhole components are required to comply with standards such as NACE MR-0175 (for corrosion), and A825 meets this standard, even at high temperatures where many grades of stainless steel will not qualify. A825 is also readily available and more easily welded than some of the more exotic steel alloys. The tube may serve as armor to protect the inner tube/composite combination, and can also serve as a return path to complete the electrical circuit between an uphole computer, core conductors, and downhole sensor.

The methods according to the invention are useful for producing slickline cables deployed in wellbores consisting of a composite, such as a low-resin-content epoxy/fiber composite, sandwiched between two metallic tubes. Any practical ratio of epoxy/fiber may be used. However, preferably from about 30 to about 50% by weight of epoxy is mixed with from about 70% to about 50% by weight fibers, both based total composite weight; more preferably from about 35 to about 45% by weight of epoxy is mixed with from about 65% to about 55% by weight fibers, both based total composite weight. The fiber filaments may have a coating which reacts with the epoxy thus enabling chemical as well as mechanical bonding between the fibers and epoxy. Slickline cables prepared according to the invention may have any effective diameter which requires very high tolerances (±2 mils) in the pultruded composite. Preferably the diameter is up to about 0.5 inches, more preferably up to about 0.2 inches, even more preferably up to about 0.1 inches. In some embodiments, the diameter may even range from about 0.11 to about 0.13 inches, such as about 0.125 inches. Such diameter tolerances are very difficult to achieve due to different thermal expansion coefficients of the individual components, tension differences in the carbon fibers when its profile changes from rectangular to curvilinear during pultrusion, or loose fibers or fuzz that accumulate on top of the pultruded rod causing subsequent processing difficulties. The methods according to the invention improve the variation in diameter thus making possible preparation of cables within such narrow diameter tolerances.

The preferred designs and processes described solve the problem of thermal expansion differences by using one or more of the following techniques: flash curing the outer shell of the composite layer using infrared heating, employing the use of a glass fiber tape wrapping in the composite layer, or integrating a UV-curable epoxy shell in the composite layer.

The problem of tension differences in the fibers during pultrusion may be minimized by using a cloverleaf die followed by circular dies, multiple circular dies, coating the composite layer with polymer back flow, or even applying thin coating of epoxy after the composite is fully cured or semi-cured.

The fuzz formation in the subsequent processing may be improved using one or more of the following techniques: polymer back flow during extrusion, post coating of epoxy after the composite is fully cured and/or semi-cured, or back flow of UV curable epoxy material.

Figure 3:
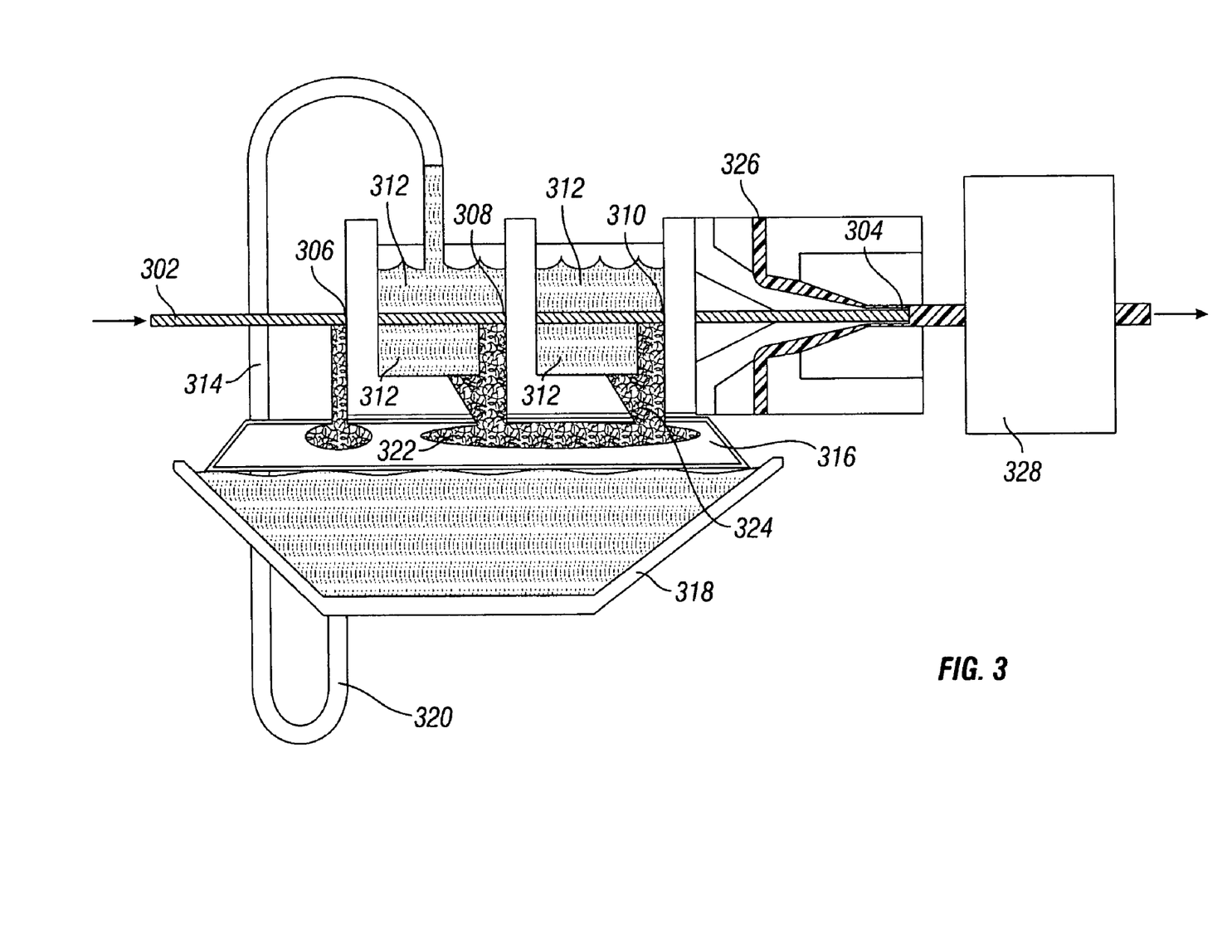
FIG. 3 illustrates in method of manufacturing a slickline cable using a series of progressively smaller diameter dies, baths of liquid epoxy, a pressurized extrusion die, and a UV radiation source for curing the epoxy.

In a first embodiment of the invention, a method of manufacturing a slickline cable which improves ovality issues, thus providing a substantially uniform circular cross-sectional shape, and helps prevent jamming during cable manufacture is illustrated in FIG. 3. This method begins by providing a tube, such as a stainless steel tube containing optical fibers which has a heat-cured epoxy/fiber composite strength layer pultruded over the stainless steel tube to form a composite tube 302. To prevent buildup of loose fibers at the extrusion tip 304, the tube 302, passes through a series of progressively smaller diameter dies, 306, 308, & 310, as well as baths of liquid epoxy 312. The first die 306 is about 25 mil larger in diameter than the diameter of the tube 302. Some loose fibers 314 are removed by the first die 306 and fall to the filter 316 below, which is positioned above vessel 318 for containing and recirculating via 320, a mixture of uncured epoxy and fibers. The composite clad tube 302 then passes through a first epoxy tank 312. At the end of the first bath is a die 308 with a diameter 15 mil in diameter larger than the diameter of the tube 302. Any loose fibers caught by the die accumulate on the filter 316 below the bath rather than at the die. The tube 302 then runs through a second epoxy bath 312 before entering the final extrusion die 310 at a diameter about 3 mil greater than the diameter of tube 302. The final pressurized extrusion die 304 applies a 2-mil layer of epoxy 326 to the tube 302. This epoxy 326 is at a viscosity sufficient to maintain the round profile as the tube 302 is exposed to UV radiation, such as UV lamps, at 328 where the epoxy 326 is at least partially or fully cured. The outer stainless steel tube is welded and drawn over the cured epoxy/fiber composite after passing under UV radiation source.

Referring again to FIG. 3, the circulating epoxy bath tanks 318 provide extended contact time to saturate the epoxy into the cured composite surface. Accumulated loose fibers 314, 322, 324 are gradually removed as the tube 302 passes through the increasingly smaller dies 306, 308, 310 and collected in the 316 filter on the recirculating tank 322. This prevents loose fibers from accumulating at the extrusion tip 304 and jamming the extrusion line.

Figure 4A:
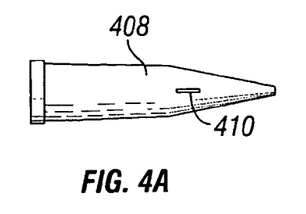
FIGS. 4A and 4B show a polymer backflow compression extrusion die as used in a method of manufacturing a slickline cable.
Figure 4B:
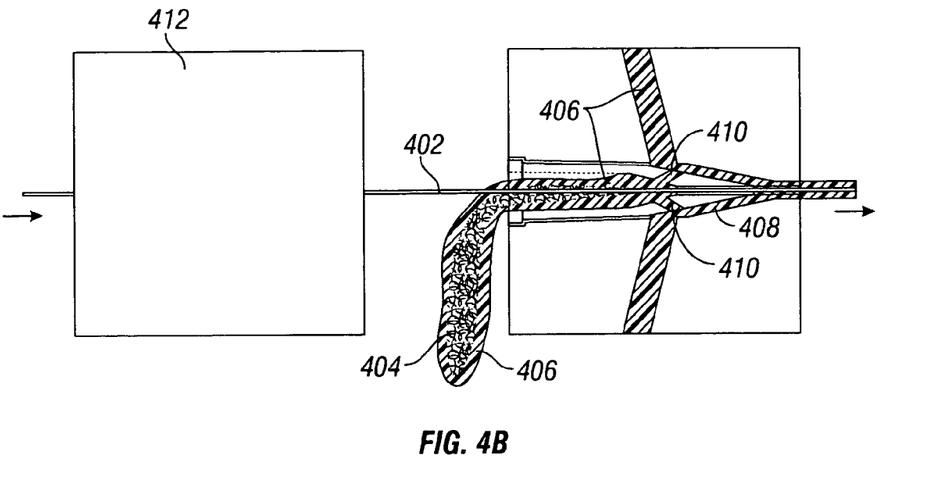

Referring now to FIG. 4A and FIG. 4B, in another embodiment of the invention, a method of manufacturing a slickline cable using a polymer backflow compression extrusion die is disclosed. In this embodiment, loose fibers 404 are removed from the cured epoxy/fiber composite outside the tube 402 containing the optical fibers by allowing a small amount of polymer 406 to flow out the back of the extrusion tip 408. Small, evenly spaced holes 410 around the body of the tip 408 allow from about 10 to about 15% of the polymer 406 to flow out the back out of the tip 408, opposite to the direction tube 402 is moving. Polymer 406 encases moving backward through the tip carries away any loose fibers 404 and prevents those fibers from building up at the entry point to the tip. The polymer 406 exiting the back of the tip 408 falls away and may be collected as scrap. This design provides an effective method to prevent fiber accumulation from jamming the extrusion line. The contact time with the polymer is also high so as to even out any ovality in the composite profile, and give about a 1 to about a 2-mil thickness of polymer above the cured composite. To prevent blistering of the thermoplastic during compression extrusion, an infrared heater 412 at least partially preheats the epoxy/fiber composite (which may be partially or fully cured) to remove moisture and volatiles from the epoxy/fiber composite before it contacts any hot melted thermoplastic.

Figure 5A:
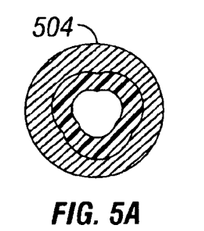
FIGS. 5A, 5B, 5C and 5D illustrate the use of a cloverleaf shaping die in concert with circular dies in the manufacturing a slickline cable.
Figure 5B:
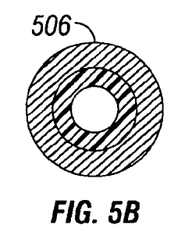
Figure 5C:
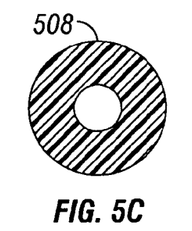
Figure 5D:
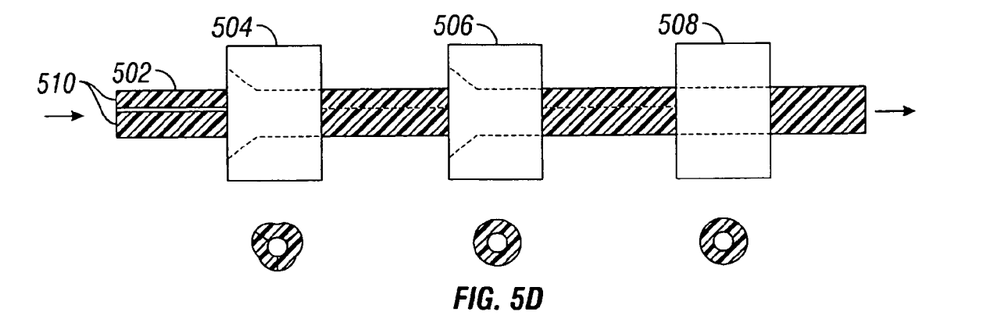

In another embodiment of the invention, as illustrated in FIGS. 5A, 5B, 5C, and 5D, a method of manufacturing a slickline cable using a cloverleaf shaping die, the design consists of a series of shaping dies 504, 506, 508 to improve profile uniformity of the composite tow coated tube 502, the composite formed from three tows 510 (only two shown). FIG. 5D shows the process and the cross-sectional shape of the tube 502 below, as it passes through dies 504, 506, 508. FIGS. 5A, 5B and 5C are cross-sections of shaping dies 504, 506, 508. Referring now to FIG. 5D, in a first stage, cloverleaf shaped die 504 is placed and rotated at a 120 degree offset angle from the cloverleaf shape of the three uncured tows 510 laden on the tube. This first die 504 places additional force at the low-stress areas at the middle of the tows, thereby forcing fibers to remain in the higher-tension edges of the tow profiles. The first cloverleaf die 504 and second circular die 506 are beveled at the entrance to facilitate tube 502 movement through the dies 504 and 506. A third, slightly smaller circular shaping die 508 with no entry angle further enhances the circular profile.

The cloverleaf die 504 allows the tension differences in the fibers at different positions of the tow to be minimized by allowing fibers from the rectangular tow to travel differing distances to reach the circular profile. An entry angle at the front of the cloverleaf die 504 allows excess epoxy to be removed from the composite. The composite tow coated tube 502 enters the die at the cloverleaf profile, which tapers down to a circular profile approximately to 60% of the die length from the entrance. The second die 506 also has and entrance angle and maintains a circular profile throughout the die length. The third die 508 with a circular profile is added which has no entry angle, and serves to minimize or prevent the communication of the fiber tension difference at the entrance of the cloverleaf die 504 and the exit of the third die 508. The accumulated friction of the composite tow coated tube 502 against the three dies causes this effect and helps to minimize ovality of the final product due to tension difference. As an option, the cloverleaf die 504 at the front of the shaping die series could be replaced by an additional circular die at the end of the series. This die would have no entry angle and a circular profile throughout. Here, the accumulated friction between the cable and the three dies would serve to minimize communication of the fiber tension difference at the entrance of first die and the exit of the third or last die.

Figure 6A:
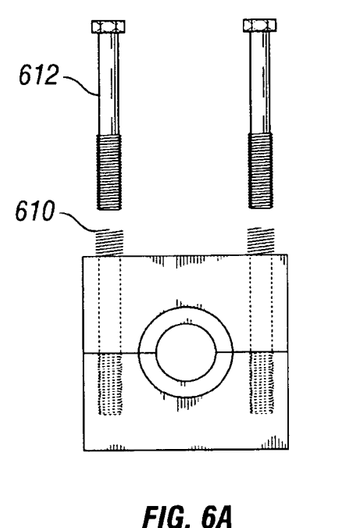
FIGS. 6A, 6B and 6C represent the use first and second split die and the application of a layer of epoxy as used in the manufacturing a slickline cable.
Figure 6B:
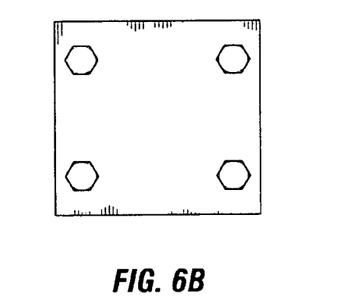
Figure 6C:
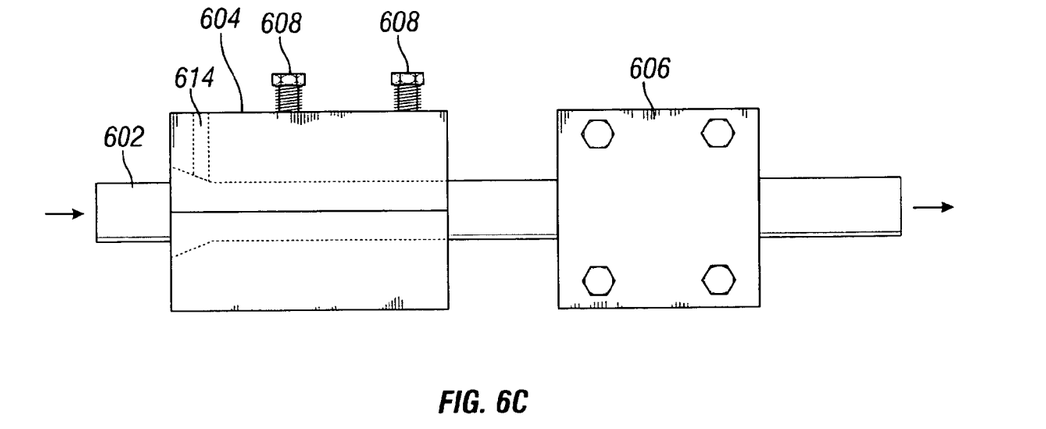

In another embodiment of the invention, a method of manufacturing a slickline cable using split dies with spring clamps is provided, and illustrated in FIGS. 6A, 6B and 6C. FIG. 6C shows the overall configuration while FIGS. 6A and 6B are side views of the split dies. The method presents another type of circular-profile shaping die. This spring-loaded split design prevents line jams by expanding to allow abnormalities to pass through the die. Split dies 604 and 606 are held together with a spring clamp system 608, which include springs 610 (only one indicated) and screws 612 (only one indicated). Any major anomalies in the cable's profile will cause the clamps to expand momentarily rather than jamming the process line. The first die 604 is beveled at the front to facilitate the cable (composite tube) 602 entering the series of spring-loaded split dies. A skim layer of the epoxy used in the cured epoxy/fiber composite is extruded, or applied over the cable 602 near the front of the first spring-loaded split die 604 through port 614 to fill in any cracks or abnormalities in the partially cured epoxy/resin strength members. This thin coating of epoxy may perform any the following functions: reduces the ovality of the cable; removes loose fibers that build up on the composite surface; repairs cracks in the composite created in the composite by thermal coefficient differences; results in finer tolerance laser micrometer readings; and/or prevents excessive wear in the sizing dies and the extrusion tip. The second die 606 has a slightly smaller circular profile and is rotated 90 angular degrees from the first 604. This second die 606 provides a second, cleaner wipe to the coated epoxy.

Figure 7A:
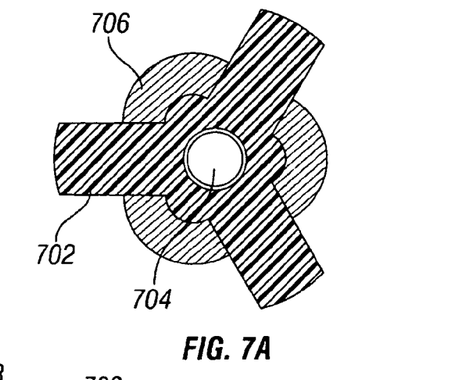
FIGS. 7A, 7B and 7C illustrate how shaped strength member guides are used in the manufacturing of a slickline cable.
Figure 7B:
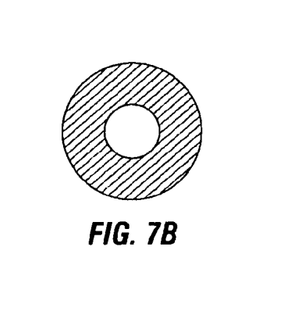
Figure 7C:
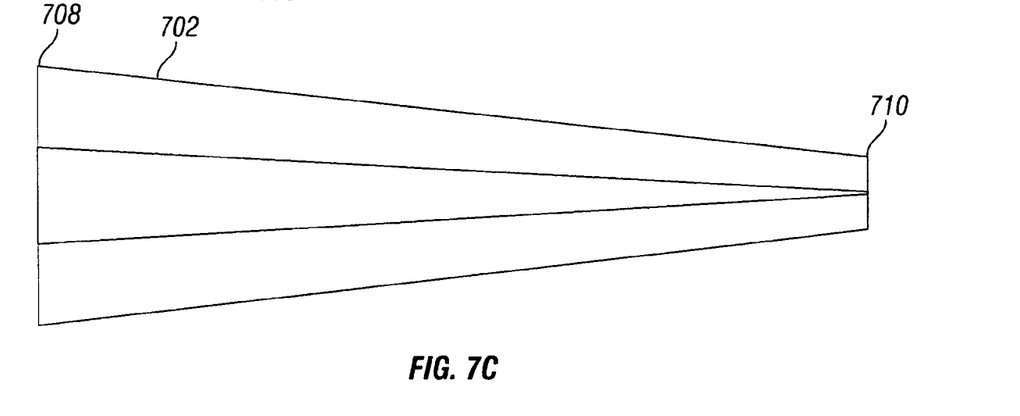

In yet another embodiment of the invention, a method of manufacturing a slickline cable is disclosed which incorporates shaped strength member guides, where the guide channels and forms uncured epoxy/composite tows in place as they are placed over an inner tube containing optical fibers, see FIGS. 7A, 7B and 7C. FIG. 7A is a front view, and FIG. 7C is a side view of guide 702. The conductor or tube travels through an orifice (hole) 704 in the center of the guide 702. The uncured rectangular epoxy/composite tows 706 (only one indicated) travel through guide 702 and are shaped to final curvilinear dimensions. The guide 702 is cone-shaped with the base 708 of the cone where the rectangular tows enter the guide and the tip 710 where the curvilinear tows 706 exit the guide 702 onto the tube. The slickline cable in FIG. 7B (cross-section shown) then enters a pultrusion die where the tows are further shaped and consolidated onto the tube.

Figure 8:
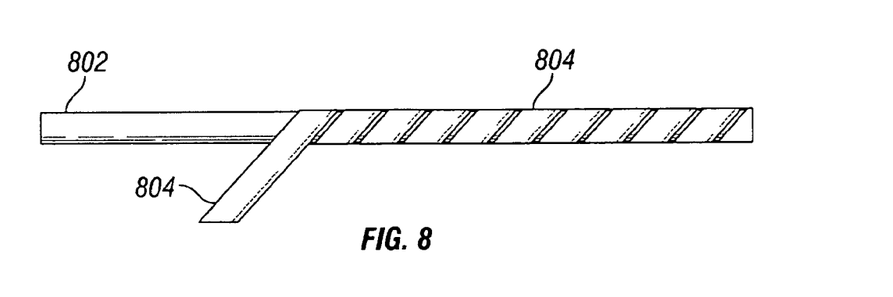
FIG. 8 indicates how a glass fiber tape may be wound over epoxy/fiber composite tube.

In some embodiments of the invention, illustrated in FIG. 8, a glass fiber tape 804 may be wound over, or otherwise disposed upon epoxy/fiber composite tube 802. In this approach, the pultruded epoxy/fiber composite thermoset is wrapped in a glass fiber tape 804 to hold the round profile during heat curing. The tape 804 is placed at a lay angle and may be overlapped if desired. The tape may also be epoxy coated to bond with the epoxy/fiber composite. This design is applied over the uncured pultruded shape 802 after the pultrusion dies have applied the tows to the inner metallic tube. In addition to holding the profile during heat curing, the tape 804 also lessens the likelihood of the long fibers with a 0 degree lay angle from splitting as the members are pulled over sheaves under tension. The tape could be applied immediately following the initial series of pultrusion dies, such as those described herein above.

According to the invention, any of the general embodiments described above may be used either alone or in combination to form slickline cables.

Figure 9:
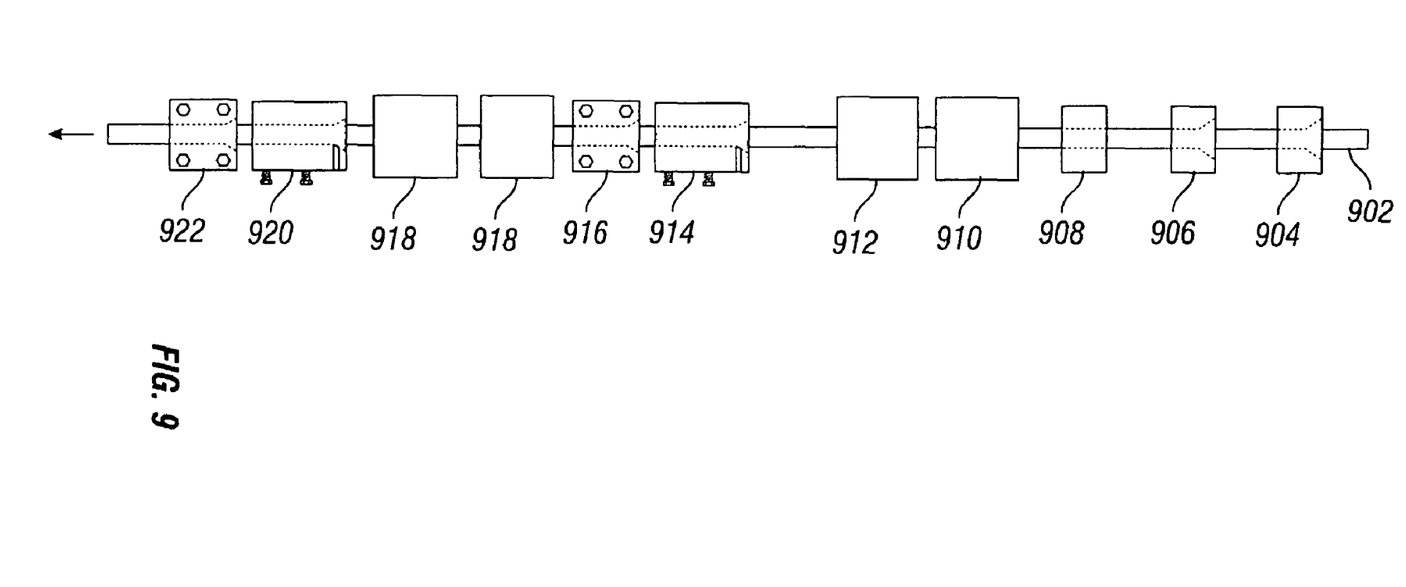
FIG. 9, FIG. 10, and FIG. 11 illustrate some overall processes for placing epoxy/fiber composite over a tube in a slick line cable production line, which may be used in accordance with the invention.
Figure 10:
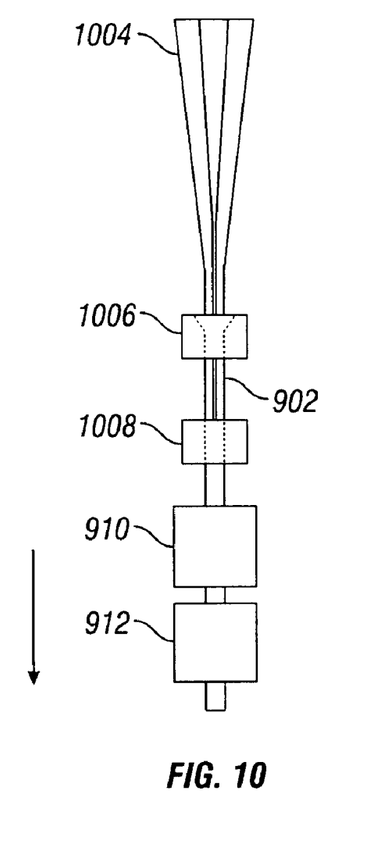
Figure 11:
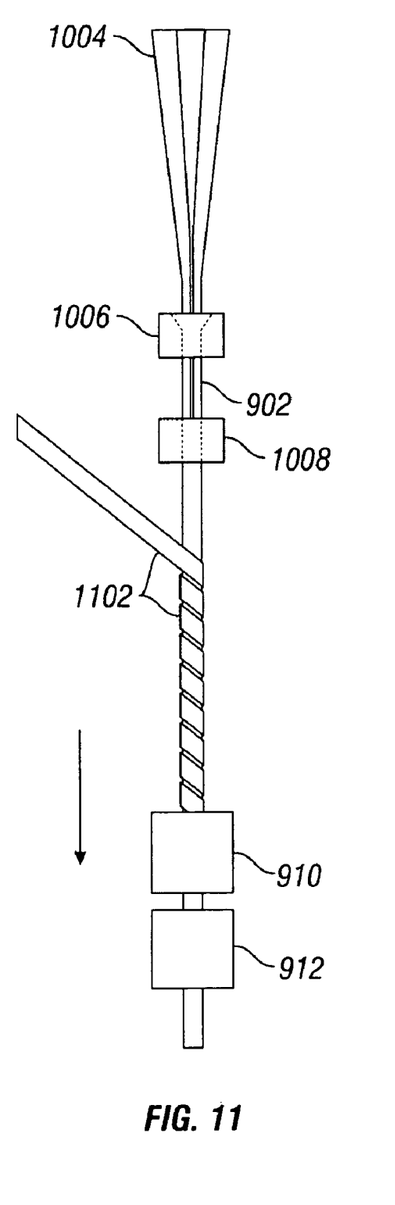

FIG. 9, FIG. 10, and FIG. 11 illustrate some overall processes for placing epoxy/fiber composite over a tube in a slick line cable production line, which may be used in accordance with the invention. In the embodiment illustrated by FIG. 9 three or more epoxy/fiber strength members (or tows) are brought together over an inner tube comprising optical fibers to form composite tube 902 immediately before entering cloverleaf die 904, one of a series of shaping dies, similar with 504, 506, and 508 of FIG. 5. The cloverleaf die 904 forms the three epoxy/fiber strength members over the conductor to compensate for the tension difference occurring due to the change from a rectangular to a curvilinear shape. The cable (composite tube) 902 then travels through two more circular shaping dies 906 908 before passing through an infrared heat source 910 to at least partially cure or consolidate the epoxy resin. This infrared heater 910 quickly cures the outer surface of the composite before allowing significant expansion of the tube contained in composite 902. This may help to better maintain the circular profile of the composite tube 902. Next the cable passes through a series of heating ovens 912. During this time the epoxy may be almost 90% cured. The composite tube may cool hereafter. Then the composite tube 902 passes through a spring clamp split die 914 (such as that described in FIG. 6) where a skim coat of epoxy is applied to fill any voids on the surface of composite tube 902. The cable (tube) 902 then passes through a second split spring-clamp die 916 (such as that described in FIG. 6), then a final infrared heat source 918 to quickly flash cure the epoxy so that it does not run, deform, oval, flatten nor drip when exposed to heat. The composite tube 902 may pass then pass through an optional second set of spring-clamp split dies 920 and 922.

Represented in FIG. 10, a shaping guide set-up may be used in place of the cloverleaf die array of FIG. 9, to provide a process such as that described in FIG. 9. Relative to FIG. 9, cloverleaf die 904 and circular shaping dies 906 and 908, are substituted with a pair of pultrusion dies 1006 1008, and used with a shaping guide 1004 similar with that illustrated in FIG. 7. The uncured rectangular epoxy/composite tows travel through guide 1004 and an inner tube is introduced through the hole in shaping guide 1004. The tows are formed over the tube to form composite tube 902. Tube 902 then enters a first pultrusion die 1006 and second pultrusion die 1008 where the tows are further shaped and consolidated onto the tube. Tube 902 then passes through an infrared heat source 910 to at least partially cure or consolidate the epoxy resin. The cable (or tube) 902 passes through a series of heating ovens 912, and then the remainder of the process as described in FIG. 9. This embodiment may also use three dies with the option of the cloverleaf as the first die to further minimize tension difference in fibers with in a single tow.

FIG. 11 illustrates the same process from FIG. 10 with the addition of the glass tape applied over the epoxy/fiber composite before the slickline cable enters the first infrared heater, similar to that illustrated in FIG. 8. As in FIG. 10, the tows travel through guide 1004 and an inner tube is introduced through the hole in shaping guide 1004, the tows formed over the tube to form composite tube 902. Tube 902 then enters a first pultrusion die 1006 and second pultrusion die 1008. Then a glass fiber tape 1102 may be wound over epoxy tube (or cable) 902. Tube 902 then passes through an infrared heat source 910, through a series of heating ovens 912, and then the remainder of the process as described in FIG. 9. This set up could also use three dies with the option of the cloverleaf as the first die to further minimize tension difference in fibers with in a single tow.

Figure 12:
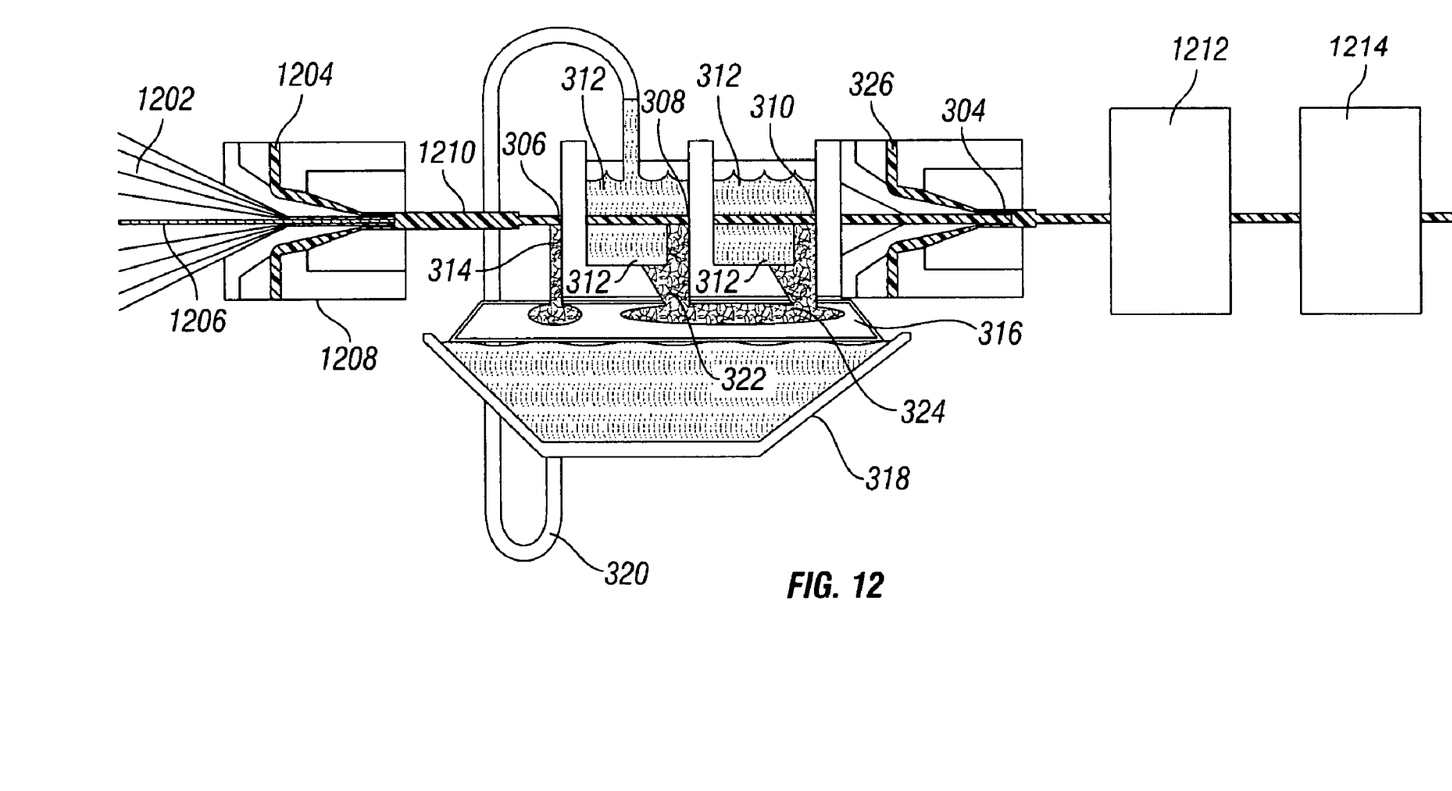
FIG. 12 represents how ultraviolet-cured-shell fiber optic lines may be used in the manufacturing of a slickline cable.

In another embodiment of the invention, ultraviolet-cured-shell fiber optic lines are used. In this method, as illustrated in FIG. 12, long fiber(s) 1202 are pultruded in an epoxy thermoset over an inner tube to form a composite tube, similar with composite tube 302 illustrated in FIG. 3 above. The epoxy thermoset resin 1204, metallic inner tube 1206, and long optical fiber(s) 1202 are introduced into the pultrusion assembly 1208, the output thereof being composite tube 1210. Composite tube 1210 then passes through the pressure-extrusion system illustrated in FIG. 3 where loose fibers are removed from the exterior of the line and UV-curable epoxy is applied may be using pressure. After exiting extrusion tip the uncured, epoxy/fiber composite tube 1210 is then exposed to UV Lamp 1212 where the outer epoxy shell is cured in a consistent round profile. Composite tube 1210 next passes through oven 1214 where the epoxy/fiber composite is cured using heat. The UV-cured outer shell prevents the profile from being deformed into an oval shape during later heat curing process(es).

The large arrows in FIG. 3, FIG. 4, FIG. 5, FIG. 6, FIG. 9, FIG. 10, FIG. 11, and FIG. 12 represent the direction the cable (tube) travels in the particular process.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:
1. A method of preparing a slickline cable comprising:
   a. providing an inner metallic tube containing at least one conductor,
   b. disposing an epoxy/fiber composite strength layer substantially upon the outer periphery of the inner metallic tube to form combination of the inner metallic tube and composite strength layer,
   c. exposing the combination of the inner metallic tube and composite strength layer to at least one means for minimizing the variation in diameter and providing a substantially uniform circular cross-sectional shape throughout the length of the combination of the composite strength member and the inner metallic tube, and
   d. drawing an outer metallic tube around the combination of the composite strength member and the inner metallic tube, the inner metallic tube, the strength layer, and the outer metallic tube extending substantially throughout the length of the slickline cable, wherein the variation in diameter of the slickline cable is about ±2 mils or less.

2. The method of claim 1 wherein the at least one conductor is an optical fiber.

3. The method of claim 1 wherein the inner metallic tube and outer metallic tube are stainless steel or nickel-chromium-iron alloy tubes.

4. The method of claim 1 wherein the diameter of the slickline cable is about 0.5 inches or less.

5. The method of claim 4 wherein the diameter of the slickline cable up to about 0.2 inches, preferably up to about 0.1 inches, more preferably from about 0.11 to about 0.13 inches.

6. The method of claim 1 wherein at least one means for minimizing the variation in diameter and providing a substantially uniform circular cross-sectional shape comprises passing the combination of the inner metallic tube and composite strength layer through three progressively smaller diameter dies and baths of liquid epoxy, wherein a first die is about 25 mil larger in diameter than the diameter of the combination, a second die is about a 15 mil in diameter larger than the combination, and a third die is about a 3 mil in diameter larger than the combination, before drawing the outer tube thereupon.

7. The method of claim 6 further comprising disposing a 2-mil layer of epoxy upon the combination of the inner metallic tube and composite strength layer after the combination passes through a third die, exposing the epoxy layer to UV radiation, before drawing the outer tube thereupon.

8. The method of claim 1 wherein at least one means for minimizing the variation in diameter and providing a substantially uniform circular cross-sectional shape comprises passing the combination of the inner metallic tube and composite strength layer through an infrared heater to pre-cure the epoxy, and then passing the combination through a polymer backflow compression extrusion die before drawing the outer tube thereupon.

9. The method of claim 1 wherein at least one means for minimizing the variation in diameter and providing a substantially uniform circular cross-sectional shape comprises passing the combination of the inner metallic tube and composite strength layer through a first cloverleaf shaped die, passing the combination through a second circular shaping die, and then passing the combination through slightly smaller third circular shaping die, before drawing the outer tube thereupon, wherein the combination is a tow coated tube.

10. The method of claim 1 wherein at least one means for minimizing the variation in diameter and providing a substantially uniform circular cross-sectional shape comprises passing the combination of the inner metallic tube and composite strength layer through a first and second split die before drawing the outer tube thereupon, wherein a layer of epoxy is applied over the combination as the combination passes through the first split die.

11. The method of claim 1 wherein the inner metallic tube containing at least one conductor passes through an orifice of a shaped strength member guide, the epoxy/fiber composite strength layer is substantially disposed upon the outer periphery of the inner metallic tube by passing at least three tows through channels on the guide and making contact with the metallic tube at the tip of the guide.

12. The method of claim 11 wherein the combination of the inner metallic tube and composite strength layer is passed through a first means for minimizing the variation in diameter and providing a substantially uniform circular cross-sectional shape, the first means comprising a first cloverleaf shaped die, a second circular shaping die, and a slightly smaller third circular shaping die, then passing the combination through a infrared heat source to pre-cure the epoxy, then curing the epoxy, then passing the combination through a second means for minimizing the variation in diameter and providing a substantially uniform circular cross-sectional shape, the second means comprising a first split die and second split die.

13. The method of claim 11 wherein the combination of the inner metallic tube and composite strength layer is passed through a first means for minimizing the variation in diameter and providing a substantially uniform circular cross-sectional shape, the first means comprising a first pultrusion die, and a second pultrusion die, then passing the combination through an infrared heat source to pre-cure the epoxy, and then curing the epoxy.

14. The method of claim 13 further comprising disposing a glass fiber tape upon the combination of the inner metallic tube and composite strength layer before passing the combination through an infrared heat source.

15. The method of claim 1 wherein the variation in diameter of the combination of the inner metallic tube and composite strength layer before drawing the outer tube thereupon is about ±2 mils or less.

16. The method of claim 1 further comprising disposing a glass fiber tape upon the combination of the inner metallic tube and composite strength layer before drawing the outer tube thereupon.

17. A slickline cable prepared according to the method of claim 1.

* * * * *